Oct. 13, 1964     T. L. BROWN     3,152,813
CHILD'S VEHICLE HAVING ELLIPTICAL WHEEL PORTIONS
Filed Aug. 2, 1962     2 Sheets-Sheet 1

Oct. 13, 1964 T. L. BROWN 3,152,813
CHILD'S VEHICLE HAVING ELLIPTICAL WHEEL PORTIONS
Filed Aug. 2, 1962 2 Sheets-Sheet 2

# United States Patent Office 3,152,813
Patented Oct. 13, 1964

3,152,813
CHILD'S VEHICLE HAVING ELLIPTICAL
WHEEL PORTIONS
Theodore L. Brown, Appleton, Maine
(Star Rte., Union, Maine)
Filed Aug. 2, 1962, Ser. No. 214,386
2 Claims. (Cl. 280—220)

This invention relates in general to motion devices, and is more particularly concerned with a device capable of being set in motion by a human or trained animal operator and imparting motion to the operator or an associate, simulating the motion of other things.

An object of this invention is to provide structure capable of resting on and contacting a supporting surface and in turn capable of supporting directly or indirectly a human operator, wherein the contacting portions of the structure are oriented relative to the supporting surface and the remainder of the structure such as to impart an up-and-down rolling motion to the remainder of the structure and to the operator or an associate when the operator moves the structure by an appropriate manner of moving as indicated above.

These and further objects and advantages of the invention will be apparent from the accompanying specification and drawings, in which.

Figure 1:
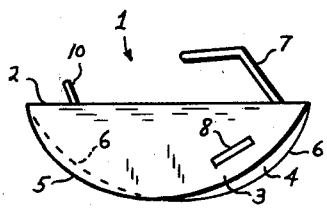
FIGURES 1 to 3 are right-side, rear, and left-side views respectively of an embodiment of the invention set into motion by rocking by the operator, with FIGURE 4 showing a modification thereof.
Figure 2:
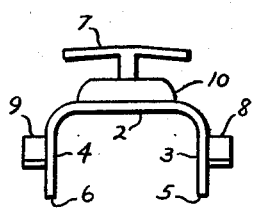
Figure 3:
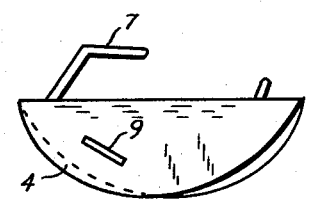

Referring to FIGURES 1 to 3 of the drawings, an embodiment of the invention actuated by rocking may comprise an arched device 1 having an upper portion 2, downwardly extending side portions 3 and 4 with lower edge surfaces 5 and 6 respectively, and if desired may further comprise a grip member 7, foot rests 8 and 9 on portions 3 and 4 respectively, and a seat-defining ridge portion 10. Various portions such as 2 to 4, or the entire structure, may be formed of plastic molded integrally, or may comprise plastic, metal such as tubular pipes, wood or other appropriate materials formed separately and attached together. If formed of flat plywood for example, portions 2 to 4 may be formed as one piece and steamed or otherwise treated and bent into the contoured shape shown in the end view of FIGURE 2, or portion 2 may be a flat separate piece joined perpendicularly or at slightly obtuse angles to separate flat pieces 3 and 4. The grip member 7 may be in the form of handlebars as shown, or may comprise a simple T-handle, a ship's pilot wheel, a stud similar to a saddle pommel, or even reins attached to the side portions 3 and 4 or a simulated horse head if desired.

A main feature of this embodiment of the invention distinguishing from prior rocking-type structures is the structure of the edge of one side portion relative to the edge of the other side portion. FIGURE 1 indicates that the edge of the front half, for example, of side 3 may be closer to the upper portion 2 and farther from the supporting surface such as a floor than is the edge of the front half of side 4, and the edge of the rear half of side 3 may be farther from upper portion 2 and closer to the floor than is the edge of the rear half of side 4, as shown. The edges are formed by circular arcs of the same radius of curvature, with the center points of the circles horizontally aligned but spaced one behind the other. Because of this relative structure, a person sitting on upper portion 2 and rocking the structure will impart to the portion 2 of the device, and will have imparted to him, an up-and-down rolling motion along the sides as the edge surfaces 5 and 6 successively contact the supporting surface such as a floor. In this manner the person will be rolled from side to side while experiencing the usual back and forth rocking motion. The effect is stimulating and amusing, and simulates the natural motion obtained in riding boats or horses for example.

Such motion may be obtained by pushing the person's feet on the floor, or the feet may rest on optional members 8 and 9 in the form of flat rests or stirrups or the like with motion obtained by the usual to-and-fro rocking of the person's body. The ridge member 10 limits the rearward position of the person's body when sitting on upper portion 2, but may be eliminated if desired or if the portion 2 is roughened or otherwise contoured to prevent the person's body from slipping off the end.

Figure 4:
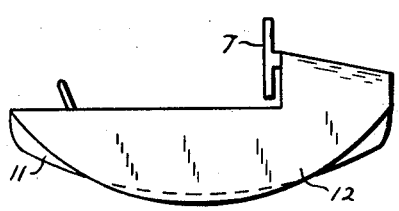

In the very different boat-shaped embodiment shown by the side view of FIGURE 4, the side edges are circular arcs of different radii of curvature and oriented with the center points of the circles vertically aligned but spaced one above the other so that one side 11 may be lower than the other side 12 in two places such as front and rear, with the other side 12 lower in one position such as the center, to provide a triple sideways rolling motion tipping first to the right, then left, then right, while rocking back and forth. Side 12 may have an additional rear or forward portion lower than side 11 to impart a quadruple sideways rocking motion, and so forth; each side may comprise a number of connected circular arcs or may be sinuous with as many alternate crests and troughs, displaced relative each other between sides, as necessary to produce the number of sideways rolls desired. This embodiment represents a substantial improvement over prior rocking devices such as the toy penguin rocker in French Patent No. 990,128 delivered June 6, 1951.

Figure 5:
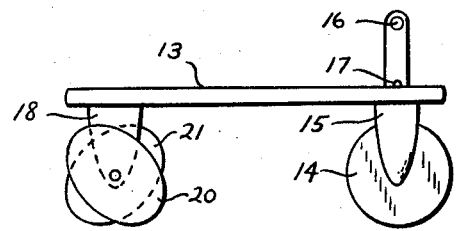
FIGURES 5 to 7 are right-side, rear, and bottom views respectively of another embodiment of the invention, actuated by walking or pushing.
Figure 6:
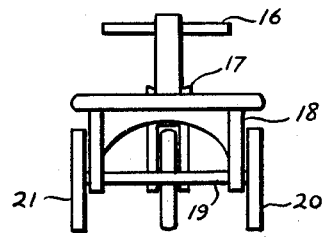
Figure 7:
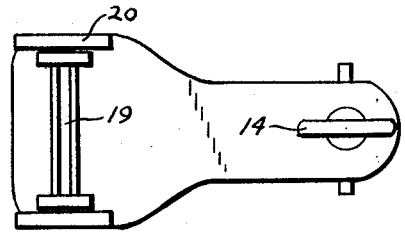

The embodiment of FIGURES 5 to 7 is in the form of a translatory vehicle such as a tricycle, for example a walking trainer for small children. The device may comprise an upper seat member 13, a single circular front wheel 14 rotatably supported in shouldered yoke 15 extending up through and rotatable in a hole in seat member 13, a handle bar 16 attached to the upper end of the yoke member 15, a pin or other suitable means 17 attached to the yoke to prevent it from slipping down through the hole, and rear wheel bracket portions 18 through which rotatably extends rear wheel axle 19.

Affixed to the axle, to rotate therewith but not relative thereto, are two substantially rigid noncircular wheels 20 and 21, meaning wheels in the shape of a noncircular geometrical figure, which may be triangular, square, pentagonal or other polygonal shape which may have rounded corners for smoother operation, but the figure preferably is elliptical as shown. The wheels preferably are oriented with their planes parallel, but with their major axes at a right angle to each other. In this manner propulsion of the vehicle along the surface, by the rider walking or by someone pushing the rider and vehicle, will impart a sideways rolling motion as well as an up-and-down motion to the seat portion 13 and to the rider if seated thereon. The front wheel also may be elliptical if desired to provide an up-and-down motion at the front while cooperating with the rear wheels in the sideways rolling motion. This structure is a marked improvement over prior devices, such as in U.S. Patent No. 1,256,454 with only an oval front wheel or 1,449,163 having eccentrically mounted bearings in circular wheels, providing only a bucking motion without the rolling motion of the present invention. Obviously the invention is unrelated to prior traction devices such as in U.S. Patent No. 2,256,570 having structure preventing, rather than imparting, up-and-down rolling motion to the operator.

Figure 8:
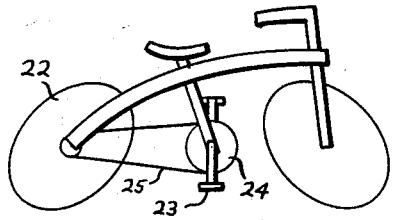
FIGURE 8 shows an embodiment actuated by pedaling.

A different modification of the invention may be in the form of the bicycle embodiment shown in FIGURE 8 having only a single elliptical rear wheel 22 for imparting up-and-down motion, with the front wheel also elliptical. The bicycle has the usual frame, seat and steering members, as well as pedal portions 23, sprocket 24, and chain 25 for propelling the bicycle by pedaling. Sideways rolling motion is achieved whenever the planes of the wheels are not aligned, the usual situation here since the front wheel fork is slanted down and the slightest turn will render the planes not aligned, as when turning corners or riding in a circle. The device may be attached by a bar to a stationary pivot pole at the center of such a circle to assure such up-and-down motion as well as to provide some stability since this configuration is very tricky to operate. The front wheel may be rotatable independently as shown or may be suitably connected to the rear wheel by a universal joint and drive shaft, or by a chain and sprocket if restricted appropriately in its steering, to maintain desired relative rotative orientation between the major axes of the ellipses. If the wheels are interconnected with the major axes parallel, the bicycle will move up and down as a unit; if interconnected with major axes nonparallel, each end of the bicycle will move up and down at different times as determined by the rotation of its respective wheel. The motion of a bucking horse will be simulated quite effectively, and not merely up-and-down but sideways as well. The elliptical wheels provide two up-and-down motions per revolution, rather than just one as in the circular wheel device of U.S. Patent No. 1,449,163 previously referred to, representing another substantial improvement thereover; and of course this invention is unrelated to prior traction devices such as in U.S. Patent No. 2,711,221 or FIGURE 17 of 2,819,767 respectively having oblate or double-crest wheels in tandem purposely avoiding, not imparting, motion to the operator.

Figure 9:
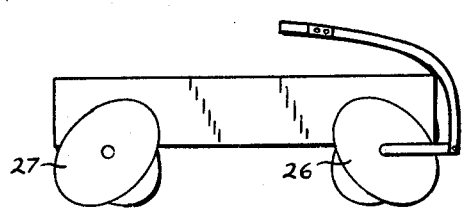
FIGURE 9 shows an embodiment set into motion by pushing by the operator, or by pushing or pulling by an assistant to a rider.

The four-wheel wagon type of configuration in FIGURE 9 is a further embodiment, in terms of increasing rather than decreasing the number of wheels. The front wheels 26 and rear wheels 27 may be affixed to their respective axles with the major axes of the wheels in each set oriented as desired for motion as described above. As in the bicycle embodiment, the front set of wheels may be interconnected with the rear set if desired, but normally the two sets are independent of each other. A universal joint such as a ball and socket may be provided at the center of the front axle connecting it to the wagon body, to enable the body to tip sideways in accordance with the motion of the rear set of wheels without restriction by the front set.

The wheels of each set of both the tricycle and wagon-type embodiments may be rotatable on rather than fixed to their axles if proper turning of corners is desired, since no rear end of the automobile type is provided to enable one wheel to travel farther than the other when turning; but any adverse effects of such affixation are negligible if the orientation is considered more important.

Figure 10:
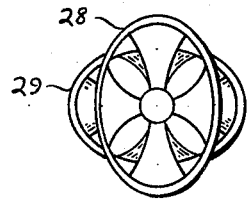
FIGURES 10 and 11 are side and end views of an embodiment actuated by walking or running, with FIGURES 12 and 13 showing side and end views of a modification thereof.
Figure 11:
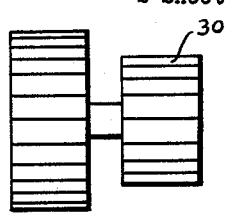

The entire seat and front wheel portions may be eliminated to result in the very novel dicycle embodiment of FIGURES 10 and 11, having two wheels but more like a unicycle than like a bicycle. The wheels 28 and 29 may be wide enough to support the foot or shoe of a person, and may have tread 30 milled, molded or otherwise formed thereon or attached thereto to provide gripping. The axle may be of any desired diameter including that of the minor axes, and may be long if greater stability is desired but preferably is as short as possible to enable the device to have a more pronounced effect. The operator stands with one foot on each wheel and begins walking or running—if a normal rearward motion of the legs is used, the operator is surprised to find himself propelled to the rear rather than forward. Coupled with this unusual effect is the fact that the distance the foot must be dropped to make contact keeps changing as the elliptical wheels rotate. The combined motion can be likened to running backward over a herd of different-sized turtles, a rather disconcerting but exhilarating effect requiring a great deal of skill and providing hilarity and a great sense of achievement if performed well. An experienced log-roller could use a reverse foot motion to propel the device and himself forward, but for unskilled persons a modification of the embodiment will enable forward translation with a normal walking or running step as described hereinafter concerning FIGURES 18 and 19.

Figure 12:
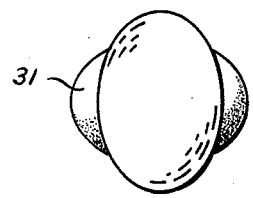
Figure 13:
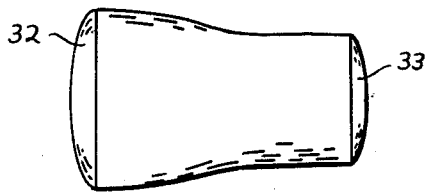

FIGURES 12 and 13 show a unicycle-type modification wherein the two elliptical parts are portions of one integral element 31 smoothly contoured from one elliptical portion to the other. The element may be formed of a hollow tube rigid enough to support the operator, and if desired may be flexible enough to provide an additional compression effect when stepped upon. Molded end caps 32 and 33, or inner ribs or other structure, may be provided to further strengthen the tube against collapse.

Figure 14:
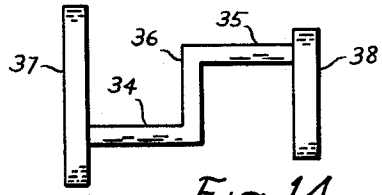
FIGURE 14 shows an end view of an additional modification actuated by pedaling, with FIGURE 15 showing a side view thereof having one wheel removed as indicated by dashed lines, with FIGURE 16 showing a further modification thereof.
Figure 15:
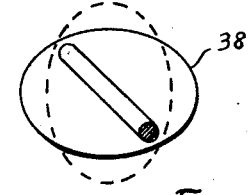

Instead of wheels actuated by walking on their surfaces, there may be wheels as in FIGURES 14 and 15 having foot-support pedal portions 34 and 35 by which the device may be pedaled. The foot supports are connected together at their inner ends by an intermediate portion 36, and are connected at their outer ends to their respective wheels 37 and 38, preferably such that the plane containing the foot supports and intermediate portion intersects the plane of each wheel at a forty-five degree angle from the major axes. This is more clearly shown in FIGURE 15 with wheel 37 removed but its location indicated by the dashed curve. The embodiment can easily be pedaled backward or forward, simulating operation of a normal unicycle but more stable because of the two spaced wheels outside of the pedals. The motion due to the elliptical shape of the wheels adds to the curious effect.

Figure 16:
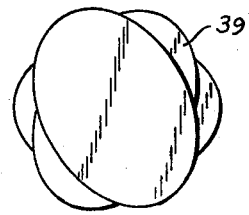

In the modification of FIGURE 16, the intermediate portion as in the preceding device may also comprise a third elliptical wheel 39, with the respective axes preferably at angles of sixty degrees one to another. The plane containing the foot supports may cut the planes of the elliptical wheels, relative to their major axes, as desired.

Figure 17:
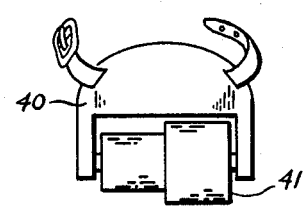
FIGURE 17 shows an embodiment of the invention actuated by a skating motion.

FIGURE 17 discloses a modification wherein wheel structure 41 similar to that of FIGURE 11, or of FIGURE 13 as well, may be utilized in roller skate structure 40. Such may be in the form of a single set of wheels to increase the balancing skill required, although an additional set may be provided spaced forward thereof to provide the usual front-to-back stability. If two sets are used, the sets preferably should be interconnected so that the wheels of one set always have their major axes parallel to the respective wheels of the other set, to prevent unnecessary sideways flexing along the foot; there will be enough unusual up-and-down and sideways motion without providing flexing also. The wheels may contact each other as shown, but thin wheels spaced farther apart will have a less pronounced effect. The ratio of major to minor axis length will be close to 1, with the wheels nearly but not actually circular, to provide the sideways effect without injuring the operator's ankles.

Figure 18:
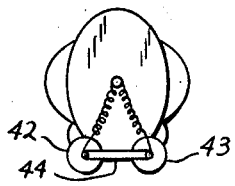
FIGURES 18 and 19 show a modification of the invention, as shown in FIGURES 10 and 11 for example, permitting forward translation along the supporting surface when actuated by a normal rearward walking or running motion.
Figure 19:
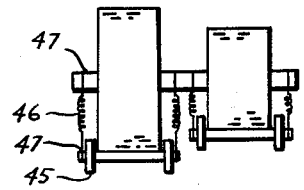

The embodiment of FIGURES 18 and 19 is for those who cannot learn to move their feet in a direction opposite to the normal motion, if desired to propel forward the device of FIGURES 10-11 and the operator. Two rollers 42 and 43 may be provided for each wheel, either permanently connected or attachable and detachable by the operator as desired. The rollers of each set are kept spaced from each other by a bar member 44 so as to prevent the elliptical wheels from touching the floor, have enlarged end flanges 45 to maintain the alignment of the rollers on the wheels, and have springs 46 connecting them by bearings or slip ring portions 47, such as a loop in the end of each spring, to the portions of the axles on each side of the respective wheel and rollers to urge the rollers against the wheel surface. A normal rearward motion of the operator's feet will rotate the elliptical wheels rearward, which in turn rotate the rollers forward, propelling the device and operator forward.

While the invention in small versions is obviously useful for the amusement and education of children, its usefulness in larger models as an amusement and therapeutic exercising device for adults should not be underestimated. The rocker or other modifications can closely simulate the motions and provide much of the exercise usually obtained from riding horses or more complicated exercising devices for example, at much lower cost and greater convenience.

Spokes and ribs rather than solid portions may be used to lighten the structure and lessen the cost, while providing sufficient rigidity to maintain the surfaces in position. The elliptical wheel portions have been shown as forty-five degree ellipses, but obviously more nearly circular ellipses such as fifty-five degree or sixty degree ellipses may be utilized if a less pronounced effect of the motion is desired. Although the invention encompasses many configurations in its genus which fall within the following broad claims, it is not to be assumed that the several embodiments are identical and equivalent; the species differ substantially from each other in structure and function, and the claims drawn narrowly thereto differ in scope and from each other, even though within the overall scope of the generic claims. Many modifications will be apparent to the artisan; however, the invention is to be limited only by the scope of the following claims.

I claim:

1. A unicycle-type device comprising an integral tubular body including two noncircular wheel portions spaced from each other and each elliptical in cross section, the major axes of each ellipse at right angles to one another, the tubular body smoothly contoured from one elliptical wheel portion to the other.

2. A device as in claim 1 further comprising two end caps at the ends of the tubular body.

References Cited by the Examiner

UNITED STATES PATENTS

| | | | |
|---|---|---|---|
| 1,223,949 | 4/17 | Flagg. | |
| 1,561,918 | 11/25 | Faddersen | 280—229 |
| 2,080,208 | 5/37 | Illch | 128—57 |
| 2,175,197 | 10/39 | Kent | 272—1 |
| 2,448,797 | 9/48 | Gustlin | 272—57 X |
| 2,510,193 | 6/50 | Pough et al. | 272—57 X |
| 2,555,480 | 6/51 | Fischer | 272—1 |
| 2,819,767 | 1/58 | Kopczynski. | |
| 3,107,914 | 10/63 | Swisher | 272—57 |
| 3,107,926 | 10/63 | Verge | 280—205 |

A. HARRY LEVY, *Primary Examiner.*

PHILIP ARNOLD, KENNETH H. BETTS, *Examiners.*